(12) United States Patent
Tarvonen et al.

(10) Patent No.: US 8,135,157 B2
(45) Date of Patent: Mar. 13, 2012

(54) HEADSET WITH ADJUSTABLE BOOM

(75) Inventors: Mika Tarvonen, Paimio (FI); Heli Sade, Billnäs (FI); Jarmo Saari, Turku (FI); Petteri Salminen, Rymättylä (FI); Sami Lehtovaara, Masku (FI); Rasmus Martenson, Kauniainen (FI); Niko Eiden, Espoo (FI)

(73) Assignee: Nokia Corporation, Espoo (FI)

( * ) Notice: Subject to any disclaimer, the term of this patent is extended or adjusted under 35 U.S.C. 154(b) by 565 days.

(21) Appl. No.: 12/162,451

(22) PCT Filed: Feb. 28, 2006

(86) PCT No.: PCT/IB2006/050614
§ 371 (c)(1),
(2), (4) Date: Jun. 26, 2009

(87) PCT Pub. No.: WO2006/129205
PCT Pub. Date: Dec. 7, 2006

(65) Prior Publication Data
US 2009/0323998 A1 Dec. 31, 2009

Related U.S. Application Data

(60) Provisional application No. 60/687,067, filed on Jun. 3, 2005.

(51) Int. Cl.
*H04R 25/00* (2006.01)
*H04M 1/00* (2006.01)
*H04M 9/00* (2006.01)
(52) U.S. Cl. ............... 381/375; 379/430; 455/575.2
(58) Field of Classification Search ............ 381/370, 381/374–376, 379, 384; 379/430; 455/575.2
See application file for complete search history.

(56) References Cited

U.S. PATENT DOCUMENTS

| 4,987,592 A | 1/1991 | Flagg |
| 5,369,857 A | 12/1994 | Sacherman et al. |

(Continued)

FOREIGN PATENT DOCUMENTS

CN 1129877 A 8/1996

(Continued)

OTHER PUBLICATIONS

U.S. Appl. No. 11/212,410, filed Aug. 26, 2005, Rasmus Martenson and Niko Eiden.

(Continued)

*Primary Examiner* — Tuan Nguyen
(74) *Attorney, Agent, or Firm* — Locke Lord LLP

(57) ABSTRACT

A headset (1) comprises a body (3) and a boom (4), on which a microphone is located. The boom (4) is mounted so that the position of a microphone (5) relative to the body (3) can be adjusted. The headset 1 further comprises a controller (15) arranged to process an electrical signal generated by the microphone (5) by equalizing components corresponding to high and low audio frequencies in accordance with the detected position of the microphone (5). For instance, low frequencies may be preferentially attenuated if the microphone (5) is used when the boom (4) is in a retracted position. Optionally, the controller (15) may also adjust the gain of the microphone (5) in accordance with the position of the microphone (5). The headset (1) may be used to communicate with an external device (2) using a wired or wireless connection. For example, the headset (1) may convey signals to and from a mobile telephone using the Bluetooth® protocol and/or may be used for Push-to-Talk applications.

26 Claims, 5 Drawing Sheets

U.S. PATENT DOCUMENTS

| | | | |
|---|---|---|---|
| 5,504,812 | A | 4/1996 | Vangarde |
| 5,673,325 | A | 9/1997 | Andrea et al. |
| 6,768,804 | B1 | 7/2004 | Isvan |
| 6,775,390 | B1 | 8/2004 | Schmidt et al. |
| 2002/0009191 | A1 | 1/2002 | Lucey et al. |
| 2002/0067825 | A1 | 6/2002 | Baranowski et al. |
| 2002/0132585 | A1 | 9/2002 | Palermo et al. |
| 2004/0001588 | A1 | 1/2004 | Hairston |
| 2004/0052364 | A1 | 3/2004 | Bodley et al. |
| 2004/0116068 | A1 | 6/2004 | Thompson, III et al. |
| 2004/0165720 | A1 | 8/2004 | Paulson et al. |
| 2004/0229658 | A1 | 11/2004 | Kim et al. |
| 2005/0070343 | A1 | 3/2005 | Janninck et al. |
| 2005/0089185 | A1 | 4/2005 | Allen |
| 2005/0129259 | A1 | 6/2005 | Garner |
| 2006/0019729 | A1 | 1/2006 | Harris |
| 2006/0140435 | A1 | 6/2006 | Sheehy et al. |

FOREIGN PATENT DOCUMENTS

| | | |
|---|---|---|
| EP | 0690654 A2 | 1/1996 |
| EP | 1280319 | 1/2003 |
| EP | 1 530 348 A | 5/2005 |
| EP | 1530348 | 5/2005 |
| GB | 2 294 177 | 4/1996 |
| GB | 2 294 177 A | 4/1996 |
| WO | WO 99/03294 A | 1/1999 |
| WO | WO 9903294 | 1/1999 |
| WO | WO 01/19054 A | 3/2001 |
| WO | WO 0119054 | 3/2001 |
| WO | WO 2004/093490 A | 10/2004 |
| WO | WO 2004093490 | 10/2004 |

OTHER PUBLICATIONS

International Search Report of PCT/IB2006/051764—Date of Completion of Search: Sep. 18, 2006.

International Search Report for International Application No. PCT/IB2006/050614 dated Sep. 26, 2006.

Supplementary European Search Report for EP Application No. 06756045.8 dated Jun. 27, 2008.

Supplementary European Search Report of EP Application No. 06756045—Date of Completion of Search: Jun. 27, 2008.

Supplementary European Search Report of EP Application No. 06710980—Date of Completion of Search: Jun. 25, 2008.

HEADSET WITH ADJUSTABLE BOOM

TECHNICAL FIELD

The invention relates generally to devices comprising a microphone for detecting sound, such as speech, for forwarding signals based on the detected sound to an external device. In particular, the invention relates to headsets for use in wired or wireless communication applications.

BACKGROUND

Headsets are used in a variety of applications, such as telephone communications, artistic performances, dictation and so on. Such devices permit a user to speak into an input means, such as a microphone, and/or listen to audio output of a speaker without having to hold the device in their hand. Furthermore, the use of a headset may allow a user to perform such applications without necessarily remaining stationary.

Recently, wireless headsets have become available. Such devices may use wireless communication protocols, such as Bluetooth, in order to transmit data to, and receive data from, an external device.

In many examples of the prior art, the headset comprises a body with attachment means allowing the device to be clipped onto, or otherwise held in position over, a user's ear. A speaker is provided within the main body. The microphone is provided on a fixed boom which, in use, extends from the body to a position close to the user's mouth. Such fixed booms are inconvenient, as they are awkward to store and transport. For example, if the headset were used to convey data to and from a mobile telephone, the headset could be somewhat larger in size than the telephone itself and may thus be unattractive to the user.

In some other prior headsets, the microphone is placed within the main body. The distance between the microphone and the user's mouth is significantly larger and this may adversely affect the signal-to-noise ratio of the transmitted data, particularly where the headset is being used in conditions with high background noise.

This problem has been mitigated by the provision of foldable or extendable headsets. In particular, U.S. Pat. No. 6,768,804 discloses a headset arranged to work in two modes. In the first mode, the boom is extended, while in the second mode, the boom is folded. One of two openings in the boom is acoustically coupled with the microphone, depending on the whether the boom is extended of folded. The sensitivity of the microphone can be changed by adjusting the characteristics of an arrangement of acoustic channels and cavities according to whether the boom is folded or extended. Alternatively, the gain of the signal transmitted from the headset can be adjusted in accordance with the state of the boom.

In another recent development, a Bluetooth headset, manufactured by Jabra®, has been provided with digital signal processing means, in order to improve noise reduction and, therefore, sound quality.

SUMMARY OF THE INVENTION

A headset comprises a body and a boom mounted on said body. A microphone is mounted on the boom. The boom is mounted such that the position of the microphone relative to the body is adjustable. For example, the boom may be mounted so that it is slidable on the body. In order to process a signal input via the microphone, the headset comprises an equalizer configured to equalize the input signal. Said equalization is adaptable in accordance with the position of the microphone relative to the body.

For example, if a user fully extends the boom, so that the distance between their mouth and the microphone is minimised, the equalization settings and, optionally, microphone gain may be adapted in order to provide a relatively high signal quality. This can reduce the need for the user to raise their voice in order for their speech to be distinguishable from the background noise. This is particularly advantageous where a user wishes to maintain privacy of, say, a telephone conversation carried out using the headset.

Where provided for, said equalizer may be a processor that performs said equalization using DSP.

Such a headset may be used to send data to, and receive data from, a mobile telephone or other electronic device. In one embodiment, the headset may comprise a transceiver and function as a mobile telephone in its own fight.

The headset may comprise a boom switch, arranged so that adjustment of the boom activates the boom switch and causes an instruction to be sent to the mobile telephone to accept an incoming call, to reject an incoming call or to end a call that is in progress. For example, the headset may be arranged so that, when an incoming call is received, extension of the boom results in acceptance of the call. Alternatively, or additionally, a call may be terminated by closing the boom, for example, by sliding it back over the body or folding it. The use of an extendable boom can result in the headset being ergonomic and of small size, making it easy to carry in, say, the user's pocket. Where the boom is slidably mounted, the slide may be linear or curved.

The boom may be flexible. In this case, the headset may be equipped with a detector for sensing physical manipulation of the boom, permitting a user to input command signals by twisting or tapping the boom.

BRIEF DESCRIPTION OF THE DRAWINGS

Embodiments of the invention will now be described with reference to the accompanying drawings, of which.

DETAILED DESCRIPTION OF THE PREFERRED EMBODIMENTS

Figure 1:
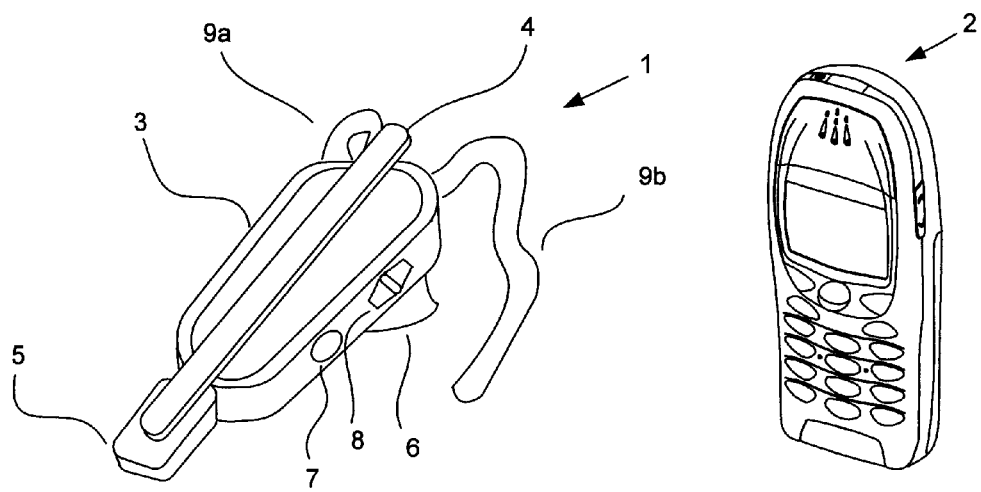
FIG. 1 depicts a headset according to a first embodiment of the invention in a closed state.
Figure 2:
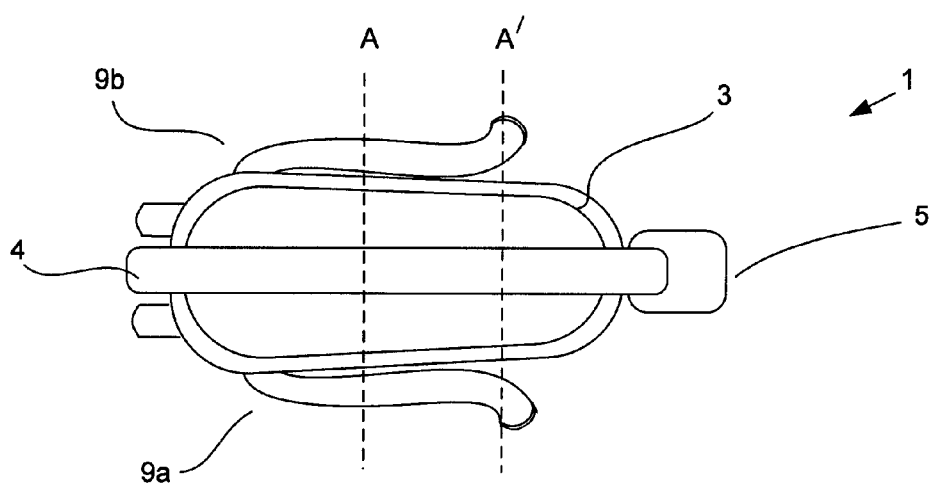
FIG. 2 is a plan view of the headset of FIG. 1 in a closed state.
Figure 3:
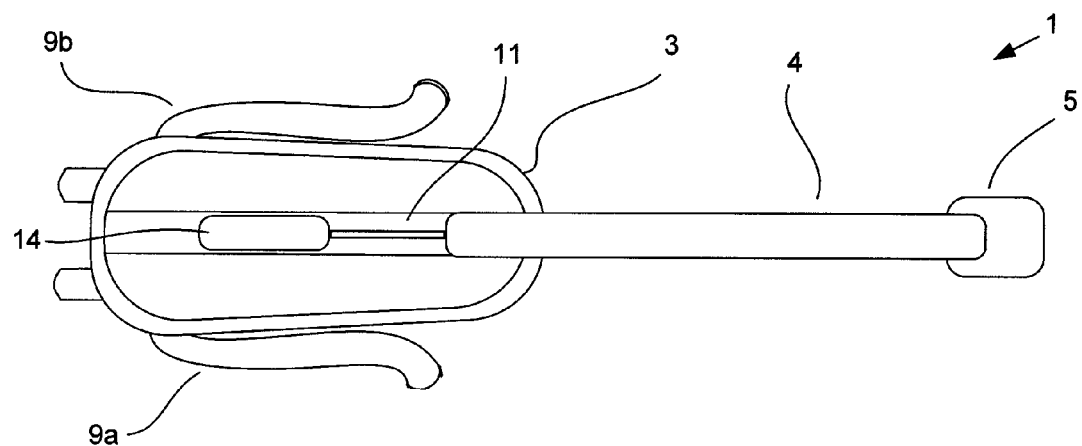
FIG. 3 is a plan view of the headset of FIG. 1 in an open state.

FIGS. 1 to 3 depict a headset 1 according to a first embodiment of the invention, together with an external device, in this case a mobile telephone 2, with which the headset 1 can communicate. The headset 1 comprises a body 3, and a boom 4. A microphone 5 is mounted on the boom 4 for receiving an input audio signal. In this particular embodiment, a speaker 6 is provided in order to provide an audio output. The headset 1 shown in FIGS. 1 to 3 also includes a switch 8 for switching the headset 1 on or off, a switch 9 for adjusting the volume of the output of the speaker 6 and arms 9a, 9b arranged to allow the headset to be clipped onto the ear of the user.

The boom 4 may be formed from a material that is either rigid, such as stainless steel, aluminium or a stiff plastics material. Alternatively, the boom may be formed from a metal or plastic material that is highly flexible or a plastic material to which a surface treatment has been applied in order to provide suitable flexibility.

The mounting of the boom 4 on the body 3 will now be described with reference to FIGS. 4 and 5. These figures depict the part of the boom 4 and of the body 3 respectively, located between the lines A, A' shown in FIG. 2. The boom 4 is mounted on the body 3 by way of formations 10a, 10b, 10c on the boom 4, shown in FIG. 4, that co-operate with a grooved formation 11 on the body, shown in FIG. 5. The co-operating formations 10a, 10b, 10c and grooved formation 11 are configured to allow the boom 4 to slide relative to the body 3 while maintaining an electrical connection between the microphone 5 and circuitry within the body 3 via contacts 12, 13a, 13b mounted on the boom 4 and in the grooved formation 11 respectively.

Figure 4:
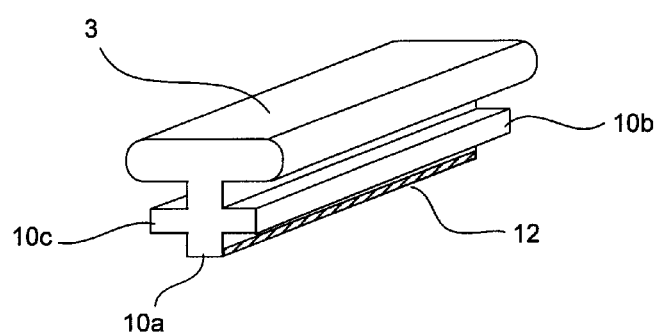
FIG. 4 is a perspective view of a part of a boom of the headset of FIG. 1.
Figure 5:
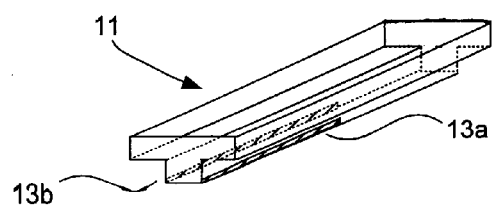
FIG. 5 is a perspective view of a part of a grooved formation in which the boom of the headset of FIG. 1 is mounted.

The co-operating formations 10a, 10b, 10c and grooved formation 11 may be arranged so that the sliding motion of the boom 3 is linear, as shown in FIGS. 2, 3 and 4, or curved. Furthermore, the formations 10a, 10b, 10c and grooved formation 11 may be configured to provide a degree of friction between them that can be perceived by a user when sliding the boom 4. Such friction provides a clear tactile sensation when extending and retracting the boom 4. In other embodiments, the formations and grooved formation 10 may be formed of different materials, selected in order to minimise wearing and friction between them.

In this particular embodiment, the boom 4 is extended and retracted manually by a user. However, if preferred, the headset 1 may be arranged so that the boom 4 is extended and retracted by a motor mounted within the body 3 (not shown). Alternatively, the boom 4 may be biased towards its retracted or extended position using resilient means, such as a spring (not shown), to provide a semi-automatic extension/retraction mechanism.

Also mounted on the body 3 is a boom switch 14 that is used to indicate to a controller 15 mounted within the body 2 whether the boom 4 is in a retracted or extended position. In this particular embodiment, the boom switch 14 is a mechanical switch that is depressed by the boom 4 when in its retracted position. As the boom 4 is extended, the boom switch 14 is released.

Alternatively, the boom switch may be a photosensor, such as a photodiode arranged to produce a photocurrent when exposed to light. The photodiode is positioned so that when the boom 4 is in an extended position and covered when the boom 4 is retracted.

Figure 6:
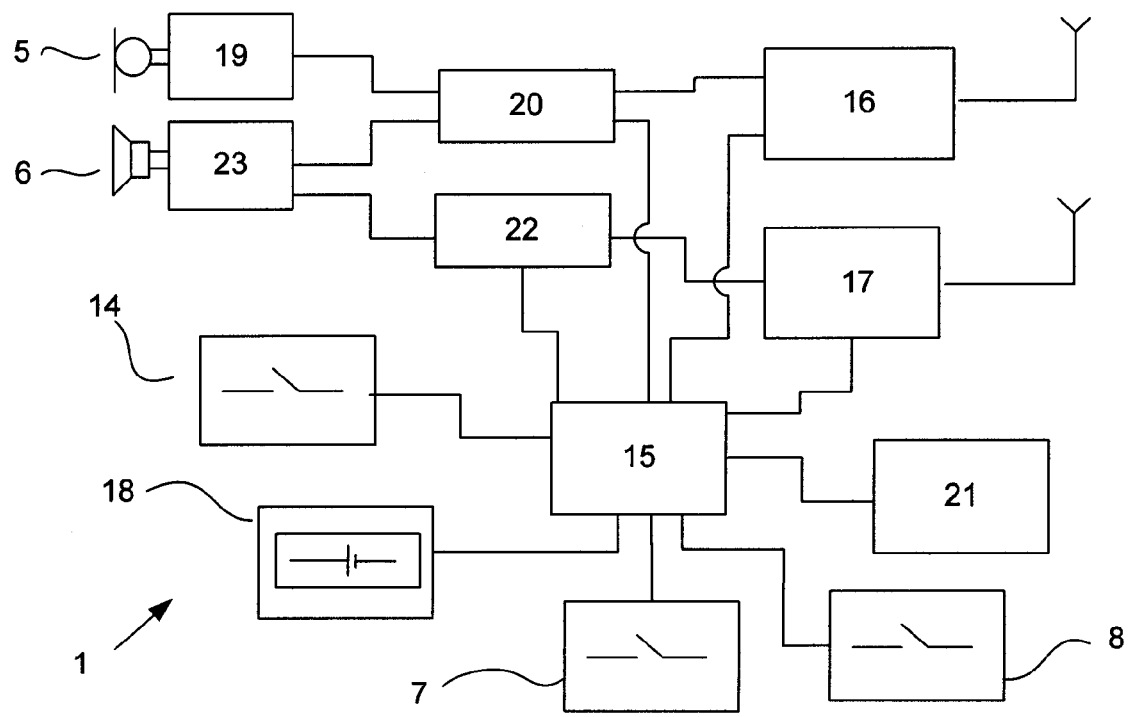
FIG. 6 is a block diagram of the components of the headset of FIG. 1.

The circuitry located within the body 3, shown in FIG. 6, includes the controller 15, which controls the transmission and reception of signals at the headset 1, via a transmitter 16 and a receiver 17 respectively, and a power source, here in the form of a battery 18.

In this particular example, the controller 15 is arranged to perform the necessary registration and link connections functions for exchanging voice/data signals with the external device 2 using the Bluetooth® protocol. Thus, the headset 1 is capable of communication with the external device when located within a range of approximately 10 meters.

In this example, where the external device 2 is a mobile telephone, a user can conduct a telephone conversation by speaking into the microphone 5 and listening to the output of the speaker 6. The microphone 5 produces an analog signal based on the user's speech. The speech signal is then amplified by an amplifier 19 and converted into a digital signal by a codec 20. Further processing of the digital signal is performed under the control of the controller 15, in accordance with software stored in a memory 21 before its transmission to the external device 2 via the transmitter 16.

A data signal from the external device 2 is received by the receiver 17 and processed under the control of the controller 15. The received signal is converted into an analog signal by a second codec 22, amplified by a second amplifier 23 and output by the speaker 6.

In this particular embodiment, the headset 1 also comprises a sensor 24, arranged to detect whether the boom 4 is extended or retracted and to provide a corresponding output to the controller 15. Such a sensor 24 may be provided as an alternative, of additional, mechanism to the boom switch 14. For example, a Hall sensor arrangement may be used as well as, or instead of, the boom switch 14. Such an arrangement could be implemented by including a magnetic element in a part of the boom 4 and a sensor coil in the body 3. Such an arrangement would be capable of distinguishing between varying degrees of extension of the boom 4.

Where a sensor 24 is provided in addition to the boom switch 14, the boom switch 14 may perform a function unrelated to the determination of the position of the boom 4. For instance, in this particular embodiment, the boom switch 14 could be used to indicate a user's acceptance, rejection or termination of a telephone call. A user could indicate that an incoming call is to be accepted by extending the boom 4 and could indicate that an ongoing call is to be terminated by retracting the boom 4. In each case, the activation of the boom switch 14 causes the controller 15 to send an appropriate instruction to the telephone 2.

The mounting of the microphone 5 on the boom 4 allows the user to move the microphone 5 from a retracted position, shown in FIGS. 1 and 2, to one or more extended positions, an example of which is shown in FIG. 3. The boom 3 may be retracted when the headset 1 is not in use, to facilitate storage or transport. However, the headset 1 may also be used with the boom 4 in its retracted position. For example, a user may prefer to use the headset 1 with the boom 4 retracted for reasons of appearance.

However, the quality of the audio signal received by the microphone 5 depends on the extension of the boom 4, as this determines the position of the microphone 5 with respect to the user's mouth. When the microphone 5 is close to the user's mouth, for example, when boom 4 is fully extended as shown in FIG. 3, the quality of the audio signal will be high. This is because the microphone will detect the user's voice as having a relatively high volume when compared with ambient noise from the user's environment. When the microphone 5 is further away from the user's mouth, the user's voice becomes less distinguishable over the ambient noise. This reduction in signal quality is particularly marked at high frequencies.

The controller 15 is configured to compensate, partially or fully, for such variations in signal quality by varying the equalization of components in the electrical signal, generated by the microphone 5, which correspond to high and low audio frequencies in accordance with the position of the microphone 5, as indicated by the extended or retracted state of the boom 4. For example, in this embodiment, when the boom 4 is in its retracted position, as indicated by the sensor 24 and/or the boom switch 14, the electrical signal is processed so that components with frequencies below 1 kHz are attenuated preferentially while components with frequencies at or above 1 kHz undergo little or no attenuation. When the boom 4 is in its extended position, the difference in the levels of attenuation of the low and high frequency components is less marked.

The equalization may be performed by the DSP, the controller 15 controlling the degree of attenuation in accordance with the position of the boom 4. Alternatively, the headset 1 may use other means for attenuating the low frequency components, for example, one or more high pass filters, to obtain suitable equalization.

Optionally, the controller 15 may also adjust the gain of the amplifier 19 according to the extension of the boom 4, so that the gain is increased when the microphone 5 is further away from the user's mouth.

Figure 7:
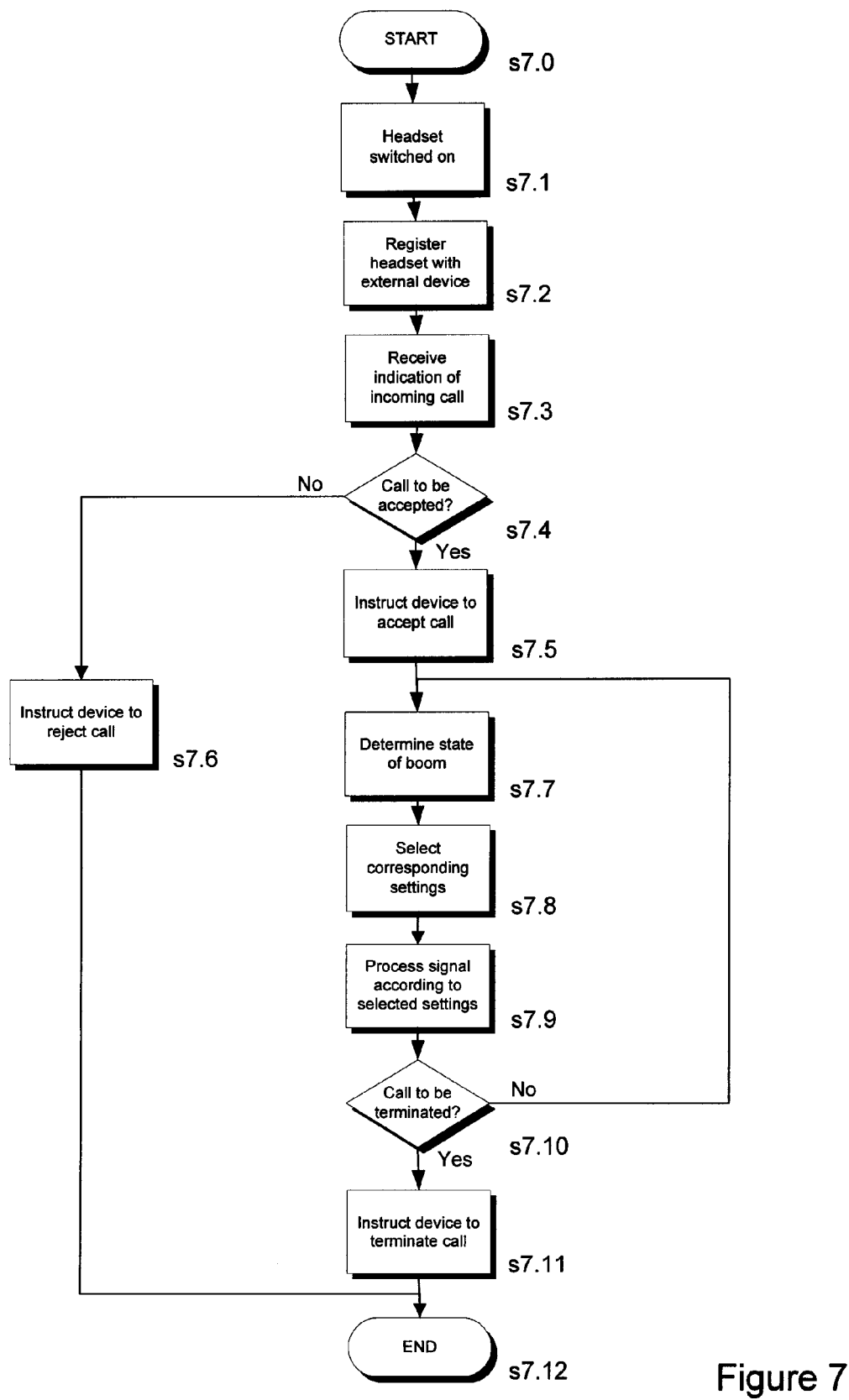
FIG. 7 is a flowchart of a procedure for changing DSP settings in the headset of FIG. 1.

FIG. 7 depicts a procedure performed by the headset 1 when a call is received by the external device 2, in which the processing of the signal generated by the microphone 5 according to the extension of the boom 4 and, therefore, the position of the microphone 5.

Beginning at step s7.0, the headset 1 is switched on (step s7.1) and is registered with the external device 2 (step s5.2) in accordance with the Bluetooth® protocol.

The headset 1 receives from the external device 2 an indication of an incoming call is indicated (step s7.3). The user may then accept the call by extending the boom 4 from its retracted position, thereby activating the boom switch 14 (step s7.4). This, in turn, causes the controller 15 to send an instruction to the external device 2 to accept the call (step s7.5).

If the user does not extend the boom 4, in other words, if the boom switch 14 is not activated (step s7.4), the controller 15 sends an instruction to the external device 2 to reject the call (step s7.6).

If a call is accepted, the controller 15 then determines the extended/retracted state of the boom 4 and, therefore, the position of microphone 5 (step s7.7), based on the output of the sensor 24. The controller 15 then selects settings corresponding to the detected state of the boom 4 (step s7.8). Two or more settings may be provided, corresponding to two or more positions of the boom 4. This selection may be achieved by retrieving the relevant settings from a look-up table stored in the memory 18 or by calculating suitable settings based on an algorithm stored in memory 18.

The electrical signal is then processed in accordance with the selected settings (step s7.9). In other words, the components of the electrical signal corresponding to high and low audio frequencies are attenuated according to the settings selected by the controller 15. For example, when the boom 4 is in its extended position, the application of the settings selected by the controller 15 may result in the components undergoing identical, or even zero, attenuation. When the boom 4 is in its retracted position, the application of the settings selected by the controller 15 may result in the components corresponding to audio frequencies below 1 kHz undergoing 5% greater attenuation when compared with the attenuation of the high audio frequency components.

Optionally, the settings may also include a gain setting for the amplifier 19. In this case, the controller 15 adjusts the gain of the amplifier 19 according to the selected settings.

While the telephone call is in progress, the boom switch 14 remains activated provided that the boom 4 remains in an extended state. However, the ambient noise conditions may change during the course of the telephone call. For example, the user may enter a relatively noisy environment, by moving from an indoors location to an outdoor location, or the user may be in an environment where the background noise is highly variable, such as a train station. The user may compensate for these changes by adjusting the boom 4 to position the microphone 5 so that it is closer to their mouth. In order to accommodate such changes, if the boom switch 14 remains activated (step s7.10), the controller 15 continues to determine the state of the boom 4 (step s7.7) and, if necessary, updates the equalization settings and, optionally, the gain of the amplifier 19, accordingly (steps s7.8, s7.9).

The user can end the call by fully retracting the boom 4, thereby deactivating the boom switch 14 (step s7.10). The controller 15 responds to the deactivation of the boom switch 14 by sending an instruction to the external device 2 to terminate the call (step s7.11). The procedure then ends (step s7.12).

In the procedure of FIG. 7, the boom switch 14 is used to indicate the acceptance, rejection and termination of a call by the user. In another embodiment of the invention, the headset 1 may be provided with a further switch, for example, in the form of a push-button, which may be used to accept or reject a call. In such a headset 1, the state of the boom switch 14 may be used to indicate whether the boom 4 is retracted or extended, thereby replacing, or supplementing, the sensor 24. In embodiments where the boom switch 14 is used in place of the sensor 24, two positions of the boom 4 can be detected and, thus, two equalization settings and, optionally, two settings for the gain of amplifier 19, can be provided. Alternatively, the boom switch may be omitted altogether.

Figure 8:
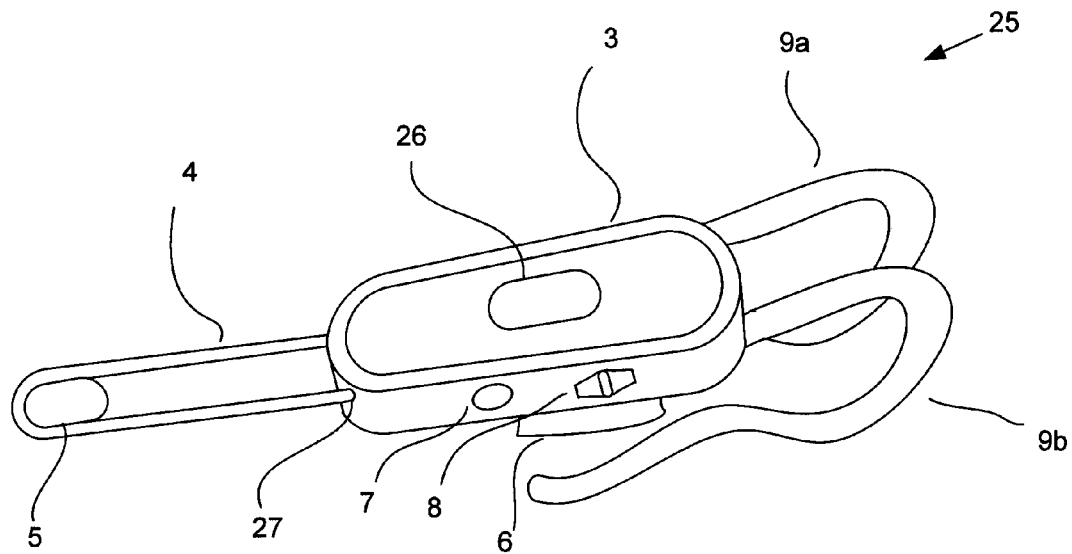
FIG. 8 depicts a headset according to a second embodiment of the invention in an open state.
Figure 9:
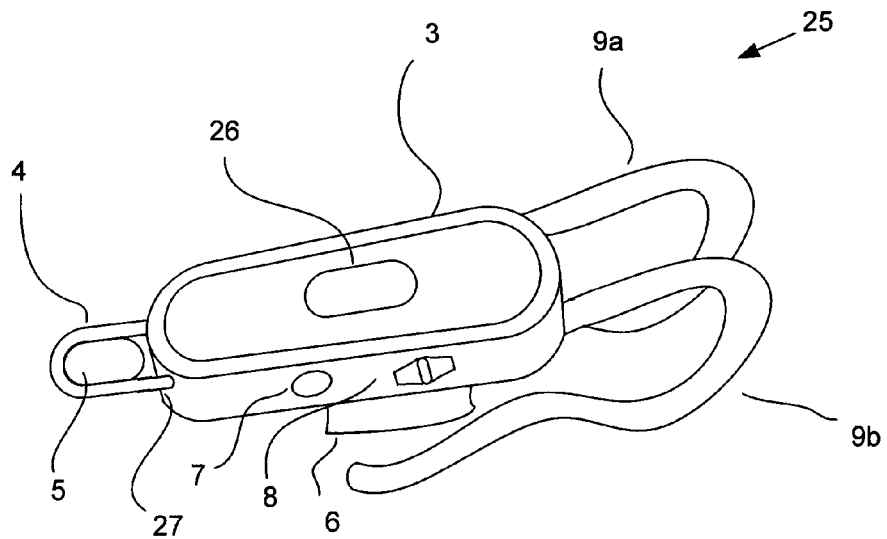
FIG. 9 depicts the headset of FIG. 8 in a closed state.

FIGS. 8 and 9 depict a headset 25 according to a further embodiment of the invention, in which such a further switch 26 is provided.

The headset 1 of FIGS. 8 and 9 also differs from that shown in FIGS. 1 to 3 in that the boom 4 is received in one or more slot formations 27, so that it slides into, rather than on top of, the body 3. Such an arrangement reduces the risk of damage to the boom 4 and the sliding mechanism of the headset 1 during storage and transport.

Alternatively, the boom 4 may be pivotally mounted on the body 3 so that it can be moved between a deployed position, in which the microphone is close to the user's mouth, and a stowed position, in which the boom 4 substantially overlies the body 3 and the boom switch 14 is activated by pivoting of the boom 4 between these two positions. In such a headset 1, there may be two modes, corresponding to the deployed position and stowed position, where each mode defines a setting for the equalization and, optionally, microphone gain.

Notwithstanding the type of mounting used to attach the boom 4 to the body 3, the boom may be made of flexible material and arranged to provide an input means, so that commands from the user can be conveyed by its manipulation. For example, instead of using a boom switch 14, keys 7, 8 or further switch 26, the user may cause the acceptance, rejection or termination of a call, or a change in speaker volume, by twisting or tapping the boom 4.

While the above described embodiments are wireless headsets, the invention can be equally implemented in a headset 1 arranged to communicate with the external device 2 using a wired link. Nor is it necessary for the headset 1 and external device 2 to communicate with one another in accordance with the Bluetooth® protocol.

In the embodiments discussed above, the headset 1 was arranged to communicate with a mobile telephone. However, the headset 1 may be used to exchange voice/data signals with other types of devices, including as audio players of dictation machines. In the case of a dictation arrangement, it might not necessary to provide a speaker 6 in the headset 1.

Alternatively, the headset 1 may itself may comprise mobile telephone functionality, for example, by comprising a transceiver configured to enable voice communication over a cellular network instead of, or as well as, the transmitter 13 and receiver 14.

The headset 1 may also be used in a Push-to-Talk application. For example, the external device 2 may be compatible with a Push-to-Talk over Cellular (POC) service. In such a service, the external device 2 maintains an active connection to a communication network, such as a Third Generation (3G), Global System for Mobiles (GSM), EDGE or even an IP network. Calls to individuals or groups can then be made instantaneously, without requiring an acceptance from the recipients of the call. The calls utilise a half-duplex Voice over IP (VoIP) connection over the communication network. Push-to-Talk applications are described in greater detail in the applicant's co-pending International patent application WO 03/00372.

The invention claimed is:

1. An apparatus comprising:
    at least one processor; and
    at least one memory including software, the at least one memory and the software configured to, with the at least one processor, cause the apparatus at least to perform:
    determining a position of a microphone, mounted on a boom, relative to a body upon which the boom is mounted, wherein the boom is mounted such that the position of the microphone relative to the body is variable; and
    processing an electrical signal, generated by the microphone, by equalizing components corresponding to high audio frequencies and low audio frequencies, wherein the equalization is adapted in accordance with the determined position of the microphone.

2. An apparatus according to claim 1, wherein said equalization is performed using Digital Signal Processing.

3. An apparatus according to claim 1, wherein the at least one memory and the software are further configured to, with the at least one processor, cause the apparatus at least to perform controlling exchange of voice/data signals with an external device.

4. An apparatus according to claim 3, wherein the at least one memory and the software are further configured to, with the at least one processor, cause the apparatus at least to perform controlling exchange of said voice/data signals with the external device via a wireless connection.

5. An apparatus according to claim 4, wherein the at least one memory and the software are further configured to, with the at least one processor, cause the apparatus at least to perform controlling exchange of said voice/data signals using the Bluetooth® protocol.

6. An apparatus according to claim 3, wherein the at least one memory and the software are further configured to, with the at least one processor, cause the apparatus at least to perform controlling exchange of said voice/data signals with the external device via a wired connection.

7. An apparatus according to claim 1, wherein the at least one memory and the software are further configured to, with the at least one processor, cause the apparatus at least to perform controlling exchange of voice/data signals with a mobile telephone.

8. An apparatus according to claim 1, wherein the at least one memory and the software are further configured to, with the at least one processor, cause the apparatus at least to perform adjusting the gain of the microphone in accordance with said position of said microphone.

9. A headset comprising the apparatus of claim 1, the body, the boom mounted on the body and the microphone mounted on the boom.

10. A headset according to claim 9, further comprising a boom switch, arranged so that adjustment of the boom activates the boom switch and causes an instruction to initiate a Push-to-Talk session to be sent to a mobile telephone.

11. A headset according to claim 10, wherein said boom switch is configured to be activated by sliding the boom so that it extends from said body.

12. A headset according to claim 10, wherein said boom switch is configured to be activated by pivoting the boom so that it extends from said body.

13. A headset according to claim 9, wherein said boom is flexible, and comprising a detector arranged to detect physical manipulation of the boom, wherein the at least one memory and the software are further configured to, with the at least one processor, cause the apparatus at least to perform generating command signals based on said detected physical manipulation.

14. An apparatus according to claim 1, wherein said equalizing comprises attenuating frequencies below a predetermined frequency value preferentially compared with frequencies above the predetermined frequency value.

15. A headset according to claim 9, further comprising a boom switch, configured so that adjustment of the boom activates the boom switch and causes an instruction to be sent to a mobile telephone to accept an incoming call, to reject an incoming call or to end a call that is in progress.

16. A headset according to claim 15, wherein said boom switch is activated by sliding the boom so that it extends from said body.

17. A headset according to claim 15, wherein said boom switch is activated by pivoting the boom so that it extends from said body.

18. A method comprising:
    determining a position of a microphone, mounted on a boom, relative to a body upon which the boom is mounted, wherein the boom is mounted such that the position of the microphone relative to the body is variable; and
    processing an electrical signal, generated by the microphone, by equalizing components corresponding to high audio frequencies and low audio frequencies, wherein said equalization is adapted in accordance with said position of the microphone.

19. A method according to claim 18, wherein said equalization is performed using Digital Signal Processing.

20. A method according to claim 18, further comprising exchanging voice/data signals with an external device.

21. A method according to claim 20, wherein said exchanging is performed via a wireless connection.

22. A method according to claim 20, wherein said exchanging is performed via a wired connection.

23. A method according to claim 20, comprising determining whether the boom has been extended and, in response to a positive determination, sending an instruction to the external device to initiate a Push-to-Talk session.

24. A method according to claim 20, comprising determining whether a call is incoming, detecting whether the boom is in an extended position and, in response to a positive determination, sending an instruction to the mobile telephone to accept the incoming telephone call.

25. A method according to claim 18, further comprising detecting physical manipulation of the boom by a user and generating command signals based on said physical manipulation.

26. A non-transitory computer-readable storage medium comprising software that, when executed by a processor, causes performance of:

determining a position of a microphone, mounted on a boom, relative to a body upon which the boom is mounted, wherein the boom is mounted such that the position of the microphone relative to the body is variable; and processing an electrical signal, generated by the microphone, by equalizing components corresponding to high audio frequencies and low audio frequencies, wherein said equalization is adapted in accordance with said position of the microphone.

* * * * *